United States Patent
Tanada et al.

(10) Patent No.: US 11,132,850 B1
(45) Date of Patent: Sep. 28, 2021

(54) AUGMENTED REALITY DIAGNOSTIC INTERFACE

(71) Applicant: International Business Machines Corporation, Armonk, NY (US)

(72) Inventors: Fabio Minoru Tanada, Campinas (BR); Edson Gomes Pereira, Cotia (BR); Patricia Pereira Fantini de Melo, Campinas (BR); Fatima Teixeira Pombo Barile, Campinas (BR); Maria Do Carmo Miranda Barbosa, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/827,954

(22) Filed: Mar. 24, 2020

(51) Int. Cl.
    *G06T 11/00* (2006.01)
    *G07C 5/00* (2006.01)
    *G06T 11/60* (2006.01)

(52) U.S. Cl.
    CPC .............. *G07C 5/008* (2013.01); *G06T 11/60* (2013.01); *G07C 5/006* (2013.01)

(58) Field of Classification Search
    CPC .......... G06T 17/20; G06T 19/20; G02B 30/35
    USPC ....................................................... 345/633
    See application file for complete search history.

(56) References Cited

U.S. PATENT DOCUMENTS

| | | | |
|---|---|---|---|
| 5,916,286 A | 6/1999 | Seashore et al. | |
| 9,128,520 B2 | 9/2015 | Geisner et al. | |
| 2003/0083789 A1 | 5/2003 | Kalley | |
| 2014/0310595 A1 | 10/2014 | Acharya et al. | |
| 2017/0293851 A1 | 10/2017 | Chawla et al. | |
| 2019/0259227 A1* | 8/2019 | Oesterling | G06Q 30/0645 |
| 2019/0287063 A1* | 9/2019 | Skaaksrud | G06Q 10/0832 |
| 2020/0143593 A1* | 5/2020 | Rudman | G07C 5/0808 |

(Continued)

FOREIGN PATENT DOCUMENTS

| | | |
|---|---|---|
| CN | 202512805 U | 10/2012 |
| CN | 105094311 A | 11/2015 |
| EP | 1087343 A1 | 3/2001 |

(Continued)

OTHER PUBLICATIONS

Ruff et al., "iX—Vokswagen—Cognitive Manual", Lighthouse, Spotlight, Modified Aug. 22, 2019, 3 pages. https://w3.ibm.com/services/lighthouse/documents/138051.

(Continued)

*Primary Examiner* — Thomas J Lett
(74) *Attorney, Agent, or Firm* — Timothy J. Singleton

(57) ABSTRACT

A method, system, and computer program product for augmented reality-based vehicle diagnostics are provided. The method receives vehicle metadata describing a vehicle. The vehicle metadata includes a problem context. The method retrieves vehicle reference data based on the vehicle metadata. A candidate problem is generated for the problem context based on the vehicle metadata and the vehicle reference data. The method generates a set of candidate solutions for the candidate problem. The set of candidate solutions address the problem context. The method generates a set of visualizations for the set of solutions based on the vehicle metadata and the candidate problem. The method presents a visualization of the set of visualizations as an augmented reality user interface.

20 Claims, 7 Drawing Sheets

(56) References Cited

U.S. PATENT DOCUMENTS

2020/0160607 A1* 5/2020 Kjallstrom .............. G06F 3/017

FOREIGN PATENT DOCUMENTS

| WO | 2016030848 A2 | 3/2016 |
| WO | 2019018308 A1 | 1/2019 |

OTHER PUBLICATIONS

"Augmented reality is shifting the boundaries of remote support" Team Viewer, Augmented Reality Support, printed Feb. 21, 2020, 6 pages. https://www.teamviewer.com/en-us/solutions/augmented-reality-remote-support/.

Shaham, "AR Remote Assistance—The Complete Guide", CustomerThink, Nov. 20, 2018, 5 pages. customerthink.com/ar-remote-assistance-the-complete-guide/.

* cited by examiner

AUGMENTED REALITY DIAGNOSTIC INTERFACE

BACKGROUND

Vehicles operate all across the world and occasionally malfunction. Malfunctioning vehicles often provide generalized error indicators without providing specified descriptions of a current malfunction. Malfunctioning vehicles that provide specific information regarding malfunctions often provide error codes which are unknown to the vehicle's driver. Some devices provide a diagnostic tool configured to plug into a port within the vehicle in order to translate error codes or query an on-board processor about existing malfunctions. Some systems provide remote malfunction diagnostics using wireless communications to pass information between a driver and a remote repair professional. Some remote diagnostic systems use a network connection to enable a remote repair professional to operate telepresence in cooperation with the driver.

SUMMARY

According to an embodiment described herein, a computer-implemented method for augmented reality-based vehicle diagnostics is provided. The method receives vehicle metadata describing a vehicle. The vehicle metadata includes a problem context. The method retrieves vehicle reference data based on the vehicle metadata. A candidate problem is generated for the problem context based on the vehicle metadata and the vehicle reference data. The method generates a set of candidate solutions for the candidate problem. The set of candidate solutions address the problem context. The method generates a set of visualizations for the set of solutions based on the vehicle metadata and the candidate problem. The method presents a visualization of the set of visualizations as an augmented reality user interface.

According to an embodiment described herein, a system for augmented reality-based vehicle diagnostics is provided. The system includes one or more processors and a computer-readable storage medium, coupled to the one or more processors, storing program instructions that, when executed by the one or more processors, cause the one or more processors to perform operations. The operations receive vehicle metadata describing a vehicle. The vehicle metadata includes a problem context. The operations retrieve vehicle reference data based on the vehicle metadata. A candidate problem is generated for the problem context based on the vehicle metadata and the vehicle reference data. The operations generate a set of candidate solutions for the candidate problem. The set of candidate solutions address the problem context. The operations generate a set of visualizations for the set of solutions based on the vehicle metadata and the candidate problem. The operations present a visualization of the set of visualizations as an augmented reality user interface.

According to an embodiment described herein, a computer program product for augmented reality-based vehicle diagnostics is provided. The computer program product includes a computer-readable storage medium having program instructions embodied therewith, the program instructions being executable by one or more processors to cause the one or more processors to receive vehicle metadata describing a vehicle. The vehicle metadata includes a problem context. The computer program product retrieves vehicle reference data based on the vehicle metadata. A candidate problem is generated for the problem context based on the vehicle metadata and the vehicle reference data. The computer program product generates a set of candidate solutions for the candidate problem. The set of candidate solutions address the problem context. The computer program product generates a set of visualizations for the set of solutions based on the vehicle metadata and the candidate problem. The computer program product presents a visualization of the set of visualizations as an augmented reality user interface.

DETAILED DESCRIPTION

Figure 1:
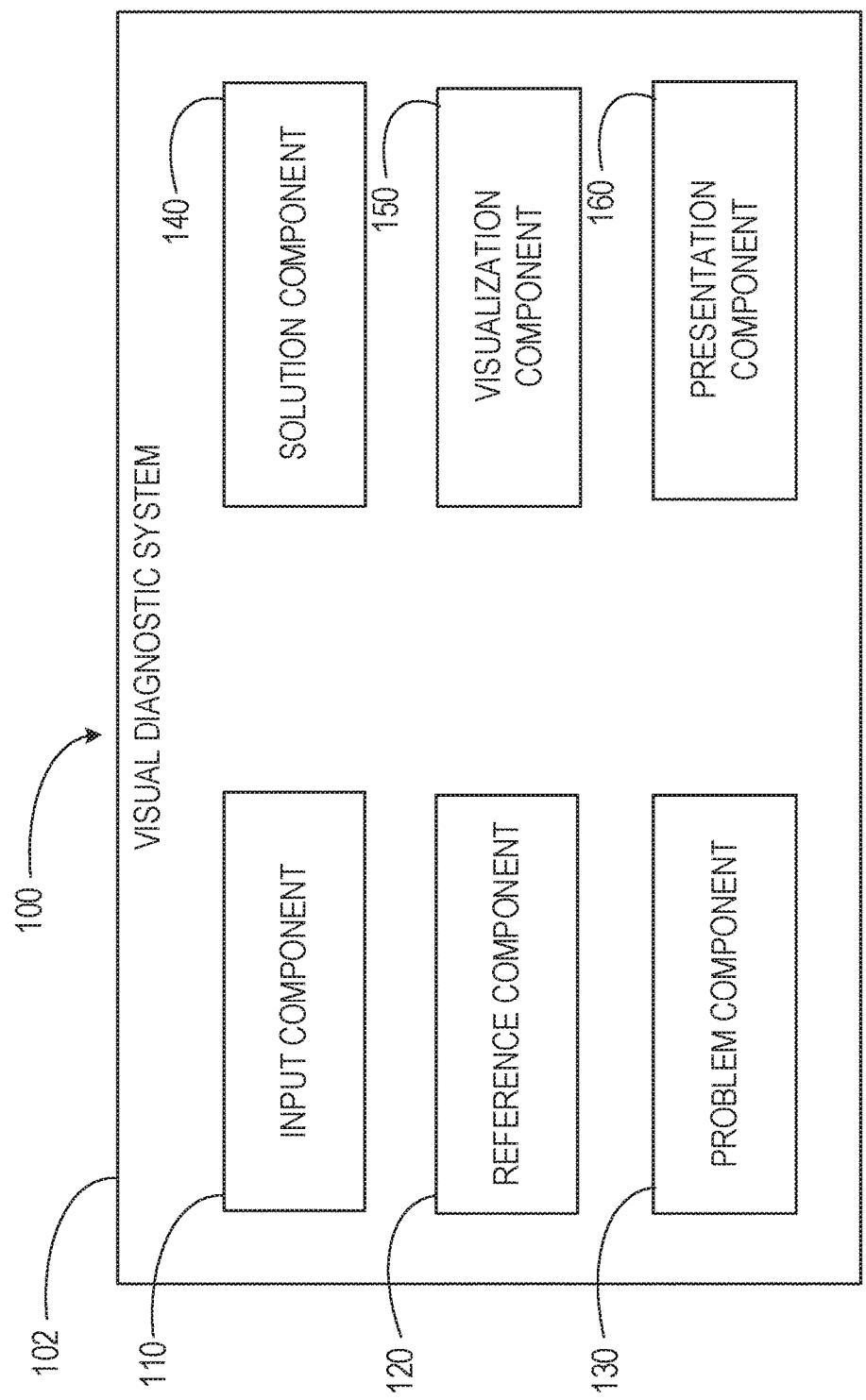
FIG. 1 depicts a block diagram of a computing environment for implementing concepts and computer-based methods, according to at least one embodiment.

The present disclosure relates generally to methods for augmented reality interfaces. More particularly, but not exclusively, embodiments of the present disclosure relate to a computer-implemented method for augmented reality-based vehicle diagnostics. The present disclosure relates further to a related system for augmented reality interfaces, and a computer program product for operating such a system.

Vehicles are used across the world in a variety of conditions. These vehicles inevitably malfunction over the course of their serviceable life. Given the investment owners make in their vehicles and the owners' reliance on their vehicles, these owners have a vested interest in maintaining vehicles in working order. However, owners and drivers may encounter vehicle malfunctions, damage from road or weather conditions, and other maintenance issues at any time or place. Often vehicle owners and drivers lack the expertise or time to perform repair or maintenance tasks on their vehicles. Further, such repair and maintenance tasks may not be possible due to equipment, weather, or location issues. Even where owners or drivers have mechanical knowledge of their vehicles, some malfunctions are difficult to diagnose and repair without specialized equipment. Current systems often rely on specialized equipment to diagnose errors and translate error codes. Some systems rely on human assistance in the form of repair professions, which may not be available when malfunctions occur.

Embodiments of the present disclosure aggregate technical and anecdotal data to provide a vehicle diagnostic system, independent of on-duty repair professionals. The present disclosure combines known technical and anecdotal data to enable real-time or near real-time diagnosis of vehicle problems and candidate solutions. Some embodiments of the present disclosure enable augmented reality-based vehicle malfunction diagnosis. The present disclosure enables diagnosis using images and information collected from technical and anecdotal information combined with images and descriptions of on-site malfunctions. In some embodiments, the present disclosure uses image recognition and natural language processing to understand a problem context of a vehicle, as captured and described by a user, and provide solution information. The present disclosure presents augmented reality interfaces capable of guiding a user through a repair process or disclosure of the problem to a repair professional.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a visual diagnostic system 102. The visual diagnostic system 102 may comprise an input component 110, a reference component 120, a problem component 130, a solution component 140, a visualization component 150, and a presentation component 160. The input component 110 receives vehicle metadata with a problem context. The reference component 120 retrieves vehicle reference data. The problem component 130 generates a candidate problem for the problem context. The solution component 140 generates a set of candidate solutions for the candidate problem. The visualization component 150 generates a set of visualizations for the set of solutions. The presentation component 160 presents a visualization of the set of visualizations as an augmented reality user interface. Although described with distinct components, it should be understood that, in at least some embodiments, components may be combined or divided, and/or additional components may be added without departing from the scope of the present disclosure.

Figure 2:
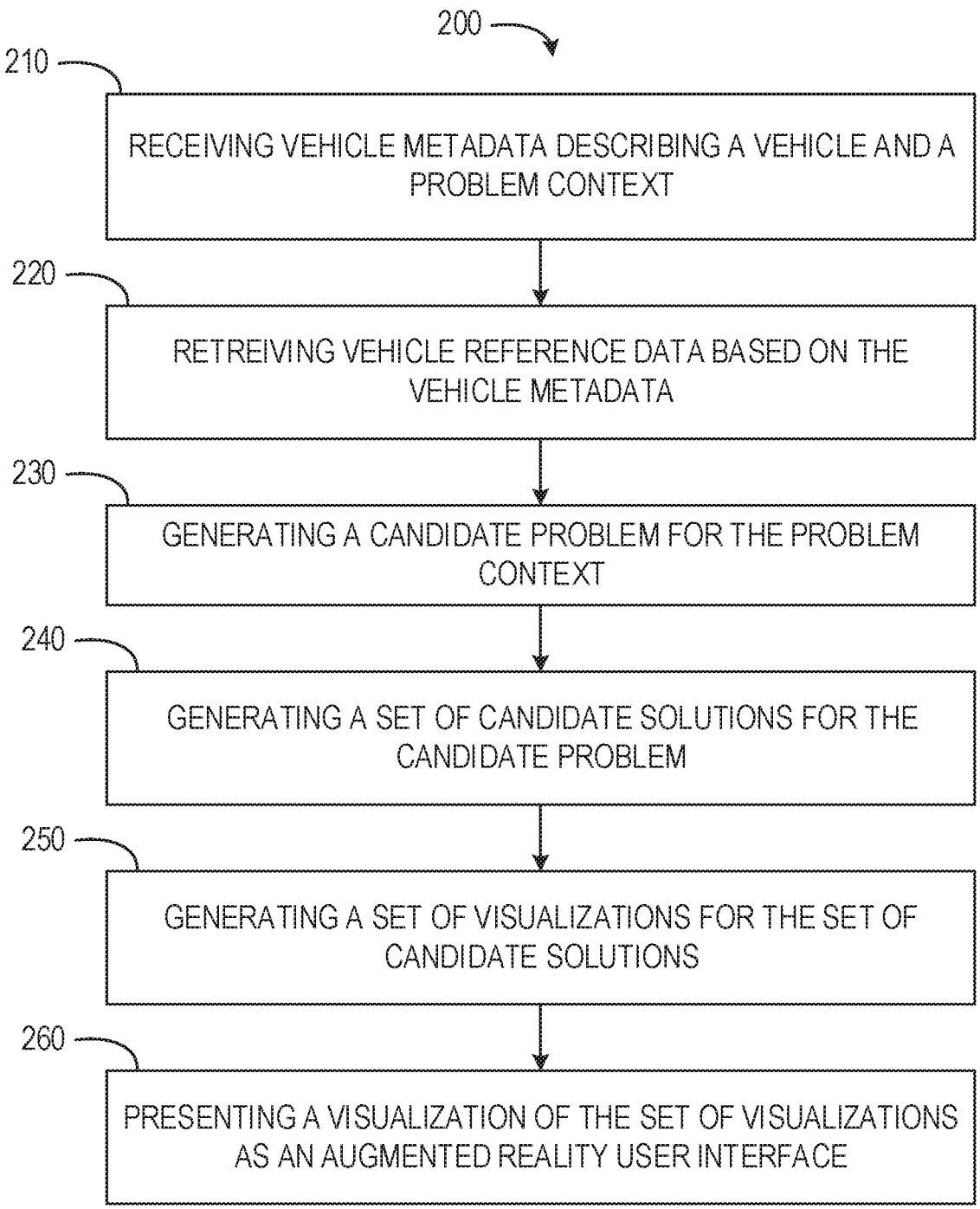
FIG. 2 depicts a flow diagram of a computer-implemented method for augmented reality-based vehicle diagnostics, according to at least one embodiment.

Referring now to FIG. 2, a flow diagram of a computer-implemented method 200 is shown. The computer-implemented method 200 is a method for augmented reality-based vehicle diagnostics. In some embodiments, the computer-implemented method 200 may be performed by one or more components of the computing environment 100, as described in more detail below.

At operation 210, the input component 110 receives vehicle metadata describing a vehicle. The vehicle metadata includes a problem context. In some embodiments, the vehicle metadata is received as a set of vehicle metadata. The set of vehicle metadata may be multimedia metadata. In some instances, vehicle metadata is received as one or more of image data, text data, audio data, annotated images, combinations thereof, or any other suitable and relevant data describing, defining, or depicting the problem context.

The vehicle metadata may be received from a mobile computing device. In some embodiments, the vehicle metadata is received, in part, from an image capture device of the mobile computing device. The vehicle metadata may be received, in part, as audio data captured by a microphone of the mobile computing device. The vehicle metadata may be received, in part, as text data captured by an input device, such as a keyboard, virtual keyboard, or touchscreen.

In some embodiments, the vehicle metadata is received as one or more files or portions of data. For example, the vehicle metadata may be initially captured as a set of pictures of one or more portions of a car, text within the set of pictures, text added within a user interface, and/or voice data within an image stream or video. The user of the visual diagnostic system 102 may encounter a problem with their car. The user may capture images to identify car details, including brand, model, trim type, engine type, odometer reading, vehicle identification number, combinations thereof, or any other vehicle information. The user may also capture additional vehicle information relating to a problem context of the car. For example, the user may capture images of a vehicle temperature (e.g., engine temperature), one or more in-dash indicators (e.g., error lights, warning lights, service lights, check engine lights, etc.), a fuel gauge, a tire pressure, an error or diagnostic code, combinations thereof, or any other suitable images depicting a problem context of the vehicle. The user may also capture images of individual components or combinations of components, such as an engine, wheels, and tires, or other suitable components.

In a video, image stream, or audio stream, the user may explain a perception of a problem context. For example, the user may vocally describe a situation, vehicle sounds, vehicle damage, vehicle smells, road conditions, vehicle conditions, combinations thereof, or any other suitable information vocally describing the problem context according to the perception and knowledge of the user. For example, the user may describe where a problem occurred, such as a location or a portion of the car, which seems to cause the problem. The user may also describe when the problem occurs, such as after starting the car, after driving for a period of time, after driving over a hole in a road, or when stopped at traffic signals.

In some embodiments, the vehicle metadata includes vehicle sensor data. The vehicle sensor data may be captured in an image or image stream. For example, the user may capture images of vehicle sensors, such as counters (e.g., odometers, mileage indicators, etc.). The user may capture images of indicator lights, such as check engine lights, oil lights, low gas lights, temperature indicators, tire pressure indicators, or other sensors, lights, or indicators positioned within a dash, a heads-up display, or an infotainment system of the vehicle. The user may also capture images of error codes or diagnostic results. For example, a heads-up display or infotainment system may display an error message, a vehicle error code, a malfunction, a diagnostic trouble code, or other indicators of a problem encountered by the vehicle.

Once received, the input component 110 may cooperate with one or more components of the visual diagnostic system 102 to parse, normalize, and format information contained in the vehicle metadata. In some embodiments, the input component 110 performs one or more image analysis operations on images, image streams, or video received as part of the vehicle metadata. The one or more image analysis operations may include edge detection, object detection, pattern recognition, template matching, object recognition, image recognition, optical character recognition, combinations thereof, or any other suitable operations configured to identify, classify, and extract information from the images. For example, where the vehicle metadata includes a picture of a vehicle, the picture may include branding, logos, instrument configurations, instrument arrangements, portions of a vehicle body, or any other visual depictions of a vehicle. The input component 110 may perform one or more image recognition operations to identify make, year, and model of the vehicle. Where the images contain depictions of a dashboard, the input component 110 may perform one or more image recognition operations to identify mileage, oil life, gas tank levels, tire pressure values, or any other indicators or values depicted on the dashboard.

Where the vehicle metadata includes text or audio, the input component 110 may perform one or more natural language processing operations on the text or audio. The natural language processing operations may be configured to identify and extract information describing the vehicle. In some embodiments, the natural language processing operations are configured to identify and extract information defining, describing, or otherwise relating to a problem or problem context for the vehicle and vehicle metadata. For example, the input component 110 may extract the user's voice from an image, video, or audio stream. The input component 110 may perform natural language processing operations on the voice to extract a user's description of the problem or problem context.

At operation 220, the reference component 120 retrieves vehicle reference data. In some embodiments, the vehicle reference data is retrieved based on the vehicle metadata received in operation 210. The vehicle reference data may be retrieved from a reference repository, storing reference data for a plurality of vehicles. In some embodiments, the reference component 120 retrieves the vehicle reference data by matching at least a portion of the vehicle metadata with one or more characteristics or aspects of the vehicle reference data. For example, where the vehicle metadata includes data indicating or depicting a car model N, a temperature light, an oil light, and a check engine light, the reference component 120 retrieves vehicle reference data including records of problems for car model N. The vehicle reference data for car model N may include instances of problems which include, as indicators, one or more of the temperature light, the oil light, and/or the check engine light.

The vehicle reference data may be stored in a reference repository. The vehicle reference data may include industry reference data, vehicle documentation, manufacturer data, recall data, and third-party reference data. The vehicle documentation may include public information relating to vehicle components, devices, parts, and materials used in the vehicle. The third-party reference data may include research and publication data, vehicle literature, white-papers, social media information, news reports, combinations thereof, and other relevant information prepared, collected, or published by parties other than a manufacturer of the vehicle. The social media information may include news and personal reports or references about personal experiences, repairs, malfunctions, recalls, warranty information, and problems relating to the vehicle as experienced by others. In some embodiments, the vehicle reference data includes subject matter expert assessments. The subject matter expert assessments may include information from subject matter experts for the vehicle. The information in the assessments may include known vehicle issues, known solutions to vehicle issues, diagnostic procedures for vehicle issues, and other relevant information prepared by individuals with suitable knowledge and qualifications relative to the vehicle.

At operation 230, the problem component 130 generates a candidate problem for the problem context. In some embodiments, the candidate problem is generated based on the vehicle metadata and the vehicle reference data. The problem component 130 may generate the candidate problem by comparing the vehicle metadata with one or more known problems occurring in the vehicle reference data retrieved in operation 220. In some embodiments, a problem repository is associated with the reference repository. The problem repository may contain a list of problems associated with each type of vehicle identified within the reference repository. Each problem of the list of problems may include or be associated with information linking the problem to various records (e.g., vehicle reference data) within the reference repository. The link or association may include keywords for each problem, selected from the vehicle reference data identifying the problem. The problem component 130 may generate the candidate problem by querying the problem repository with one or more keywords selected from or generated from the vehicle metadata and the problem context. A top result may be selected as the candidate problem. In some embodiments, the problem component 130 or the problem repository may select a problem from the problem list having a highest number of matching symptoms based on the keywords; a highest relevance; a highest number of matching keywords; a highest frequency of occurrence based on location; a highest frequency of occurrence based on the keywords; a highest frequency of occurrence based on the keywords and a vehicle type; a highest frequency or relevance based on the keywords, vehicle type, and location of occurrence; combinations thereof; or any other suitable and discernable metric. Once the candidate problem has been generated or identified, the problem component 130 may pass an indication of the candidate problem to the solution component 140. For example, the indication of the candidate problem may be a problem indicator, acting as an identifier or location of a known problem in the problem repository.

In some embodiments, the candidate problem is a set of candidate problems. In such instances, the set of candidate solutions is a plurality of sets of candidate solutions. Each set of candidate solutions is generated for a specified candidate problem of the set of candidate problems. Each candidate problem may be selected from errors, malfunctions, issues, damage, or other problems identified in the vehicle reference data. The problem component 130 may generate the set of candidate problems by accessing a problem repository associated with the reference repository. The problem repository may contain a list of problems associated with each type of vehicle identified within the reference repository. Each problem of the list of problems may include or be associated with information linking the problem to various records (e.g., vehicle reference data) within the reference repository. The link or association may include keywords for each problem, selected from the vehicle reference data identifying the problem. In such instances, the problem component 130 generates the set of candidate problems by identifying keywords within the vehicle metadata. The keywords may describe one or more of the vehicle or the problem context. The keywords from the vehicle metadata may be matched to one or more problems within the problem repository. The set of candidate problems may include each of the problems identified as having keywords matching at least a portion of the vehicle metadata.

In some embodiments, the problem component 130 ranks the set of candidate problems. The problem component 130 may rank the set of candidate problems by relevance, a number of keyword matches, confidence score, combinations thereof, or any other suitable ranking methodology. In some embodiments, the problem component 130 ranks the set of candidate problems based on a frequency of the problem occurring. Once ranked, the problem component 130 may pass the set of ranked candidate problems to the solution component 140.

At operation 240, the solution component 140 generates a set of candidate solutions for the candidate problem. In some embodiments, the set of candidate solutions are configured to address the problem context. In some embodiments, known solutions may be stored in a solution repository. The known solutions may be associated or linked to known problems stored within the problem repository. Once the candidate problem is generated or identified by the problem component 130 and passed to the solution component 140, the solution component 140 may generate the set of candidate solutions by querying the solution repository. In some embodiments, the solution component 140 is passed a problem indicator for a known problem located in the problem repository. The solution component 140 may query the solution repository with the problem indicator. The solution component 140 may retrieve, from the solution repository, one or more solutions associated with the problem indicator. The solution component 140 may select the one or more solutions, retrieved from the solution repository, as the set of candidate solutions.

In some embodiments, the set of candidate solutions are generated using a plurality of operations. In such embodiments, the solution component 140 generates an augmented instruction set for a candidate solution of the set of candidate solutions. The augmented instruction set may be generated based on the vehicle metadata and the vehicle reference data. In some embodiments, the augmented instruction set comprises a series of requests for additional input or vehicle metadata from the user. The series of requests may represent aspects of the problem context or the vehicle metadata, which are unclear. In some instances, the series of requests represent missing information, related to one or more of the candidate problem and the candidate solution. The series of requests may suggest capturing one or more images of one or more components indicated by the user, associated with the problem context, associated with the candidate problem, associated with the candidate solution, or combinations thereof. The one or more images may be suggested at different angles to capturing differing views of the one or more components.

In some instances, the series of requests are accompanied by one or more visualizations. The one or more visualizations may comprise overlay elements presented on a display of the mobile computing device. The overlay elements may be generated from reference vehicle data associated with the candidate solution. In some instances, the overlays are generated as translucent representations of a component being imaged. The overlays may also be generated as outlines or other representations of the component, in varying views of the component. The visualizations may be presented as part of the augmented instruction set. In these instances, when a user is prompted to capture an image of the component from a specified view, the overlay is presented within a field of view of the image capture device presented on the display of the mobile computing device. The user may be prompted to position the mobile computing device, such that the overlay overlaps the component in the specified view. The augmented instruction set may then prompt the user to capture the image.

The solution component 140 receives one or more images responsive to the augmented instruction set. The one or more images depict a portion of the vehicle associated with the candidate problem. Where the augmented instruction set prompts capturing images of a component from one or more angles or orientations, the one or more images may depict the component in the relevant orientations. In some embodiments, the solution component 140 receives the one or more images directly from the image capture device of the mobile computing device. In some instances, the solution component 140 receives the one or more images from the input component 110.

The solution component 140 selects a candidate solution based on the one or more images. In some embodiments, the solution component 140 performs one or more image recognition operations, as described above with respect to operations 210 and 220, on the one or more images. The solution component 140 may determine the one or more images clarify or include information missing from the vehicle metadata or the problem context. For example, the solution component 140 may use image recognition operations to match a view of a component, from one of the images to a view of the component within the vehicle reference data, such as by edge detection, pattern matching, or template matching between the respective images.

At operation 250, the visualization component 150 generates a set of visualizations for the set of solutions. The set of visualizations may be generated based on the vehicle metadata, the candidate problem, and the set of candidate solutions. In some embodiments, each visualization is generated for a specified solution based on the vehicle reference data.

The visualization component 150 may generate the set of visualizations as images, retrieved from the vehicle reference data, to be presented within an augmented reality user interface. In some embodiments, the images are retrieved and modified for presentation within a portion of the user interface. The remaining portion of the user interface may depict a field of view, or a portion thereof, of an image capture device. This side by side view, depicting a functional component from the vehicle reference data and a malfunctioning component of the user's vehicle, may be presented when the visualization is depicted on a display device of the mobile computing device.

The visualization component 150 may generate the set of visualizations as a set of overlays for presentation within an augmented reality user interface. For example, the visualization component 150 may retrieve an image of a functional component, from the vehicle reference data, associated with the candidate problem. The visualization component 150 may generate outlines of the component, based on edge detection operations. The outlines of the component may be presented as the overlay. When presented on the display device and aligned, the set of overlays may show a difference between a malfunctioning component in the user's vehicle and the functioning component from the vehicle reference data.

In some embodiments, the visualization component 150 generates the set of visualizations as one or more user interface elements to be presented within a field of view of the image capture device of the mobile computing device. In such instances, the visualization component 150 may cooperate with the solution component 140 to compare components associated with the problem context and reference images of the components. The visualization component 150 and the solution component 140 may determine differences between the present component and the reference component. The visualization component 150 may then generate the set of visualizations as arrows, lines, outlines, or other user interface elements that demonstrate differences between the present component and the reference component.

In some embodiments, the visualization component 150 generates the set of visualizations as a set of steps to be performed to repair or address the problem context. The set of visualizations may present images from repair manuals, image-based tutorials, video tutorials, or any other suitable images of repair operations. The set of visualizations (e.g., the set of repair operations) may be configured to be presented within a portion of a display of the mobile computing device. For example, the set of repair operations may be progressively or sequentially presented in a side-by-side view, depicted in the display device, as the user performs the repair operations.

At operation 260, the presentation component 160 presents a visualization of the set of visualizations as an augmented reality user interface. The visualization may be presented on a display device of the mobile computing device. In some embodiments, the set of visualizations is presented within a user interface. The user interface may include a set of user interface elements. The set of user interface elements may include representations of the candidate problem or set of candidate problems and the set of candidate solutions. The selection of a candidate solution may initiate presentation of the visualization of the set of visualizations associated with the candidate solution.

In some embodiments, the user interface initially presents interface elements representing the candidate problem or set of candidate problems. Selection of an interface element for a candidate problem triggers the presentation of additional information relating to the candidate problem. In some instances, the selection of the interface element for the candidate problem triggers the presentation of user interface elements representing the set of candidate solutions for the selected candidate problem. Selection of a candidate solution, triggered after selection of a candidate problem, may trigger presentation of the visualization, of the set of visualizations, associated with the candidate solution.

In some embodiments, once the presentation component 160 presents the visualization, the input component 110 detects a success indicator. The success indicator may be a user interface element selected by the user to represent a successful or accurate diagnosis of a problem and a successful or accurate presentation of an acceptable or relevant solution. In response to detecting the success indicator, the visual diagnostic system 102 stores the vehicle metadata, the candidate problem, and the candidate solution as a training scenario. The training scenario may be used to train or test machine learning models for identifying subsequent problem/solution combinations. In some embodiments, the visualizations are also retained in the training scenario. The vehicle metadata, retained for later testing, may be scrubbed or genericized to remove identifying information.

Figure 3:
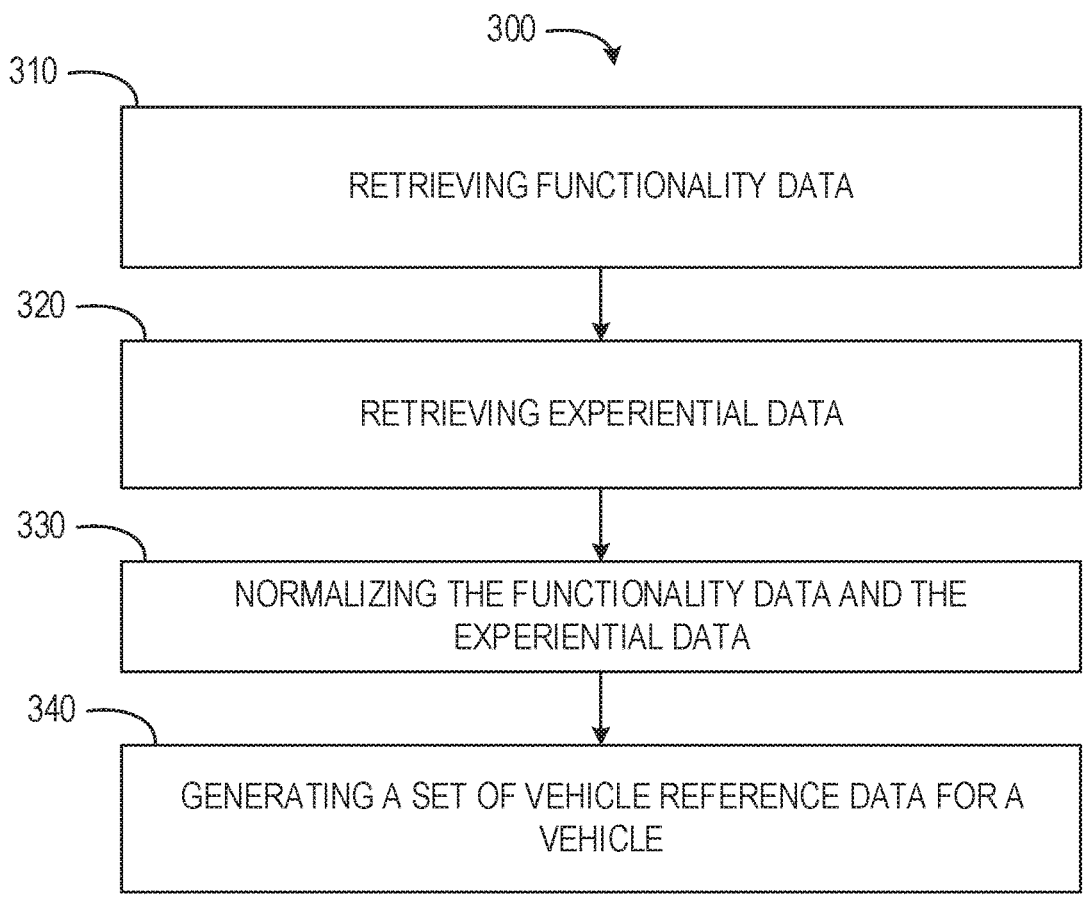
FIG. 3 depicts a flow diagram of a computer-implemented method for augmented reality-based vehicle diagnostics, according to at least one embodiment.

FIG. 3 shows a flow diagram of an embodiment of a computer-implemented method 300 for augmented reality-based vehicle diagnostics. The method 300 may be performed by or within the computing environment 100. In some embodiments, the method 300 comprises or incorporates one or more operations of the method 200. In some instances, operations of the method 300 may be incorporated as part of or sub-operations of the method 200, such as operation 220.

In operation 310, the reference component 120 retrieves functionality data. In some embodiments, the functionality data describes a functional state of the vehicle. The functionality data may include manufacturers specifications, tolerances, proper functioning parameters, dimensions, combinations thereof, or any other suitable functioning data. In some embodiments, functionality information includes vehicle information from vehicle manuals, vehicle specifications, manufacturer websites, mechanic manuals, and any other relevant information describing and defining the proper functioning of the vehicle.

The reference component 120 may retrieve the functionality data in response to receiving the vehicle metadata. The functionality data may be non-structured data, such that the data may be formatted or stored in a manner different than that of the reference repository. The reference component 120 may retrieve the functionality data in response to a user logging into the visual diagnostic system 102. In some embodiments, the reference component 120 retrieves the functionality data based on the user creating a profile for the visual diagnostic system 102. The profile may include information about one or more vehicles, providing an initial portion of vehicle metadata. In some instances, the reference component 120 retrieves functionality data in response to initiation operations. The initiation operations may include model generation or model fitting of one or more of the problem component 130 or the solution component 140. The model generation and model fitting of the problem component 130 and the solution component 140 may be generation and fitting of machine learning models to perform problem and solution determination.

In operation 320, the reference component 120 retrieves experiential data. The experiential data may be non-structured data, such that the data may be formatted or stored in a manner different than that of the reference repository. The experiential data describes user experiences with one or more vehicles. The one or more vehicles associated with the experiential data may be one or more similar vehicles that are similar to or a match to the vehicle of operation 210. The experiential data may be retrieved based on the functionality data. In some embodiments, the experiential data is retrieved from social media, video hosting platforms, technical forums, tutorial websites, or any other suitable repository of information relating to experiences of individuals or groups of people with the vehicle at issue. The reference component 120 may retrieve the experiential data in response to retrieving the functionality data or receiving the vehicle metadata.

In operation 330, the reference component 120 normalizes the functionality data and the experiential data. The functionality data and the experiential data may be normalized based on a data structure for the vehicle reference data. Normalizing the functionality data and the experiential data generates normalized vehicle data.

The reference component 120 normalizes the functionality data and the experiential data to filter and normalize collected data to create a well-structured database. The reference component 120 may remove redundancies within the functionality data and the experiential data. In some instances, the reference component 120 removes a portion of redundant data, logging or marking instances of redundancy, which indicates a prevalence of vehicle problems or commonalities in the circumstances among instances of a type of vehicle problems. In some embodiments, the reference component 120 normalizes the collected data by inserting the functionality data and experiential data into a preexisting data structure. In some instances, the reference component 120 generates, sanitizes, separates, combines, or otherwise modifies the functionality data and the experiential data to fill out relevant fields in the preexisting data structure for each entry or instance of the functionality data or the experiential data. Normalization and filtering of the functionality data and the experiential data may increase the likelihood of identifying matches between collected vehicle metadata for a problem context and the functionality data and experiential data.

In some embodiments, as part of the normalization process, the reference component 120 performs one or more image recognition operations and one or more natural language processing operations on the functionality data and the experiential data. The image recognition and natural language processing operations may be performed to extract information from one or more of the functionality data and the experiential data. The information, once extracted, may be formatted for the data structure of the reference repository. In some embodiments, the image recognition and natural language processing operations may be performed in the functionality data and the experiential data in a manner similar to or the same as described above with respect to operation 210.

In operation 340, the reference component 120 generates a set of vehicle reference data for the vehicle. In some embodiments, the set of vehicle reference data is generated based on the functionality data and the experiential data. In some instances, the vehicle reference data is generated from the normalized vehicle data. The reference component 120 may generate the set of vehicle reference data by inserting or storing the normalized vehicle data into a data structure or structured database for the visual diagnostic system 102.

Figure 4:
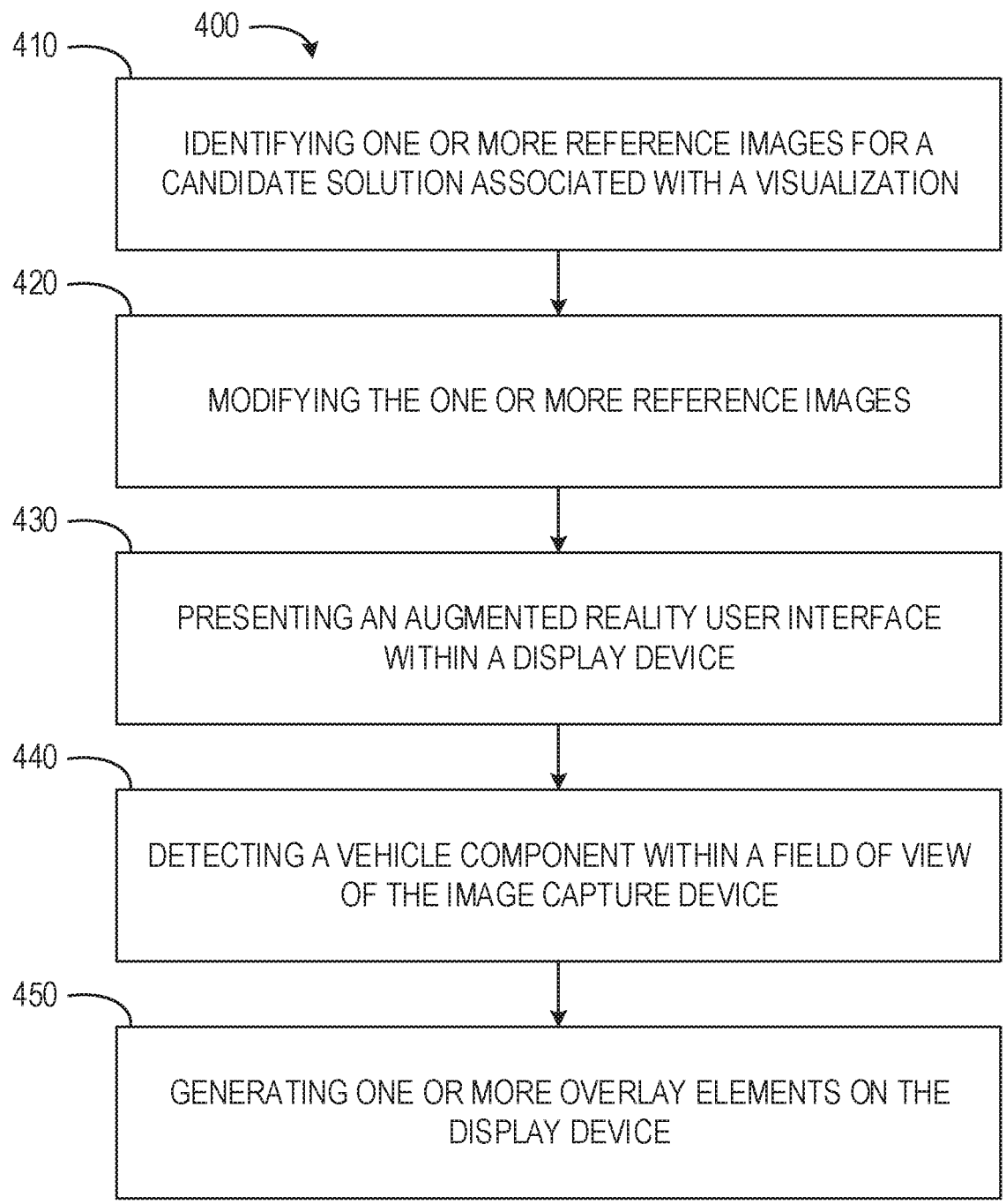
FIG. 4 depicts a flow diagram of a computer-implemented method for augmented reality-based vehicle diagnostics, according to at least one embodiment.

FIG. 4 shows a flow diagram of an embodiment of a computer-implemented method 400 for augmented reality-based vehicle diagnostics. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300, such as operation 250.

In operation 410, the visualization component 150 identifies one or more reference images for a candidate solution associated with a visualization. Reference images may be stored within the vehicle reference data and associated with candidate solutions. One or more reference images may be identified for each visualization of the set of visualizations of operation 250. In some embodiments, the one or more reference images are selected from vehicle reference data. The one or more reference images may depict one or more of a malfunction, a repair function or procedure step, a stock component, a functioning component, or any other suitable information relating to the candidate solution. In some embodiments, a plurality of reference images is associated with a candidate solution. The plurality of reference images depict a set of operations or procedures used to perform the candidate solution. In such embodiments, the visualization component 150 may identify a set of reference images being associated with the candidate solution. The visualization component 150 may also identify an order for the set of reference images.

In operation 420, the visualization component 150 modifies the one or more images. The one or more images may be modified for presentation within an augmented reality user interface. The visualization component 150 may modify the one or more images by changing dimensions, aspect ratios, or orientation of the one or more images. For example, the visualization component 150 may crop or reduce an image size to be positioned within a display device as a split-screen or side by side presentation along with other images or information. In some embodiments, the visualization component 150 modifies the one or more images by changing values for one or more of a hue, a saturation, a brightness, a luminance, and an opacity of the one or more images. For example, the visualization component 150 may modify an image by making the image translucent or transparent, to act as an overlay. The visualization component 150 may also modify the one or more images by extracting portions of the one or more images. For example, the visualization component may extract a portion of an image, such as a bolt, to superimpose the portion of the reference image near a depiction of the bolt on the user's car. In some instances, the visualization component 150 may extract an outline, a portion of an image, or a portion of a video stream. In such embodiments, the visualization component 150 may generate a new image, such as an outline or blueprint, to overlay on an image or video stream depicting a same portion of a vehicle as depicted within the reference image.

In operation 430, the presentation component 160 presents an augmented reality user interface by initializing an image capture device of a mobile computing device. The image capture device may depict a field of view on a display device of the mobile computing device. The presentation component 160 may present the field of view of the image capture device within a portion of the display device. Another portion of the display device may depict user interface elements to navigate the augmented reality user interface. In some embodiments, the presentation component 160 depicts a modified image, generated in operation 420, on the display device within the augmented reality user interface. The modified image may be displayed along with the field of view, or a portion thereof, of the image capture device.

In operation 440, the presentation component 160 cooperates with the input component 110 to detect a vehicle component within the field of view of the image capture device. The presentation component 160 and the input component 110 may perform image detection or image recognition operations to detect the vehicle component. For example, as described above in more detail, the components of the visual diagnostic system 102 may perform object recognition, edge detection, pattern matching, template matching, or any other relevant image recognition operations to match the vehicle component with the modified image generated in operation 420. The presentation component 160 and input component 110 may perform the image recognition operations in real-time or near real-time, such that the user may move the mobile computing device to position the field of view of the image capture device in a location and orientation to view the vehicle component.

In operation 450, the presentation component 160 generates one or more overlay elements on the display device. The one or more overlay elements provide solution information for a candidate solution associated with the visualization. In some embodiments, the one or more overlay elements are generated as or based on the modified images described above in operation 420. The presentation component 160 may generate the overlay elements in a manner similar to or the same as described above with respect to operations 250 and 260.

Figure 5:
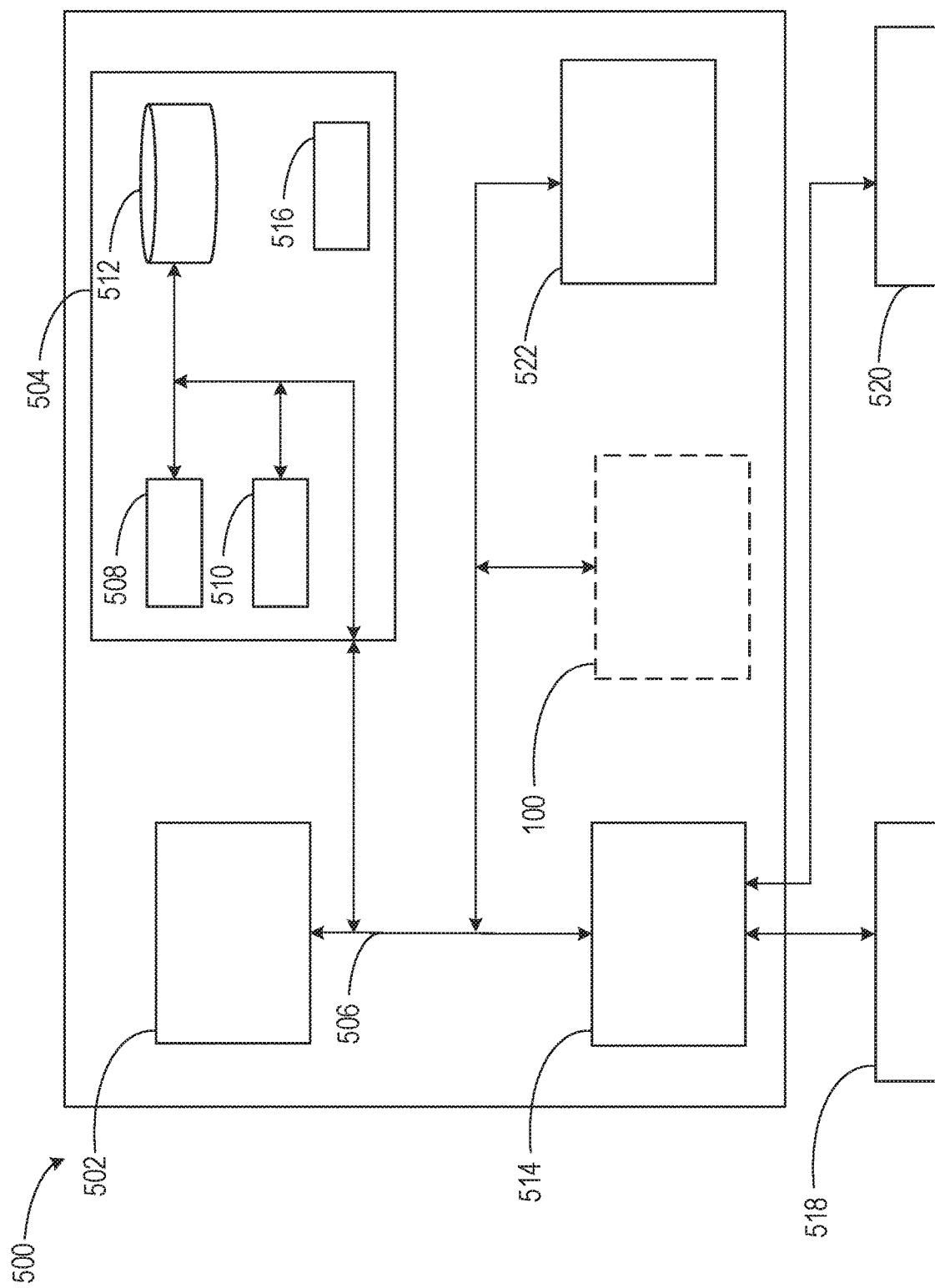
FIG. 5 depicts a block diagram of a computing system for augmented reality-based vehicle diagnostics, according to at least one embodiment.

Embodiments of the present disclosure may be implemented together with virtually any type of computer, regardless of the platform is suitable for storing and/or executing program code. FIG. 5 shows, as an example, a computing system 500 (e.g., cloud computing system) suitable for executing program code related to the methods disclosed herein and for augmented reality-based vehicle diagnostics.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the input component 110, the reference component 120, the problem component 130, the solution component 140, the visualization component 150, and the presentation component 160, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
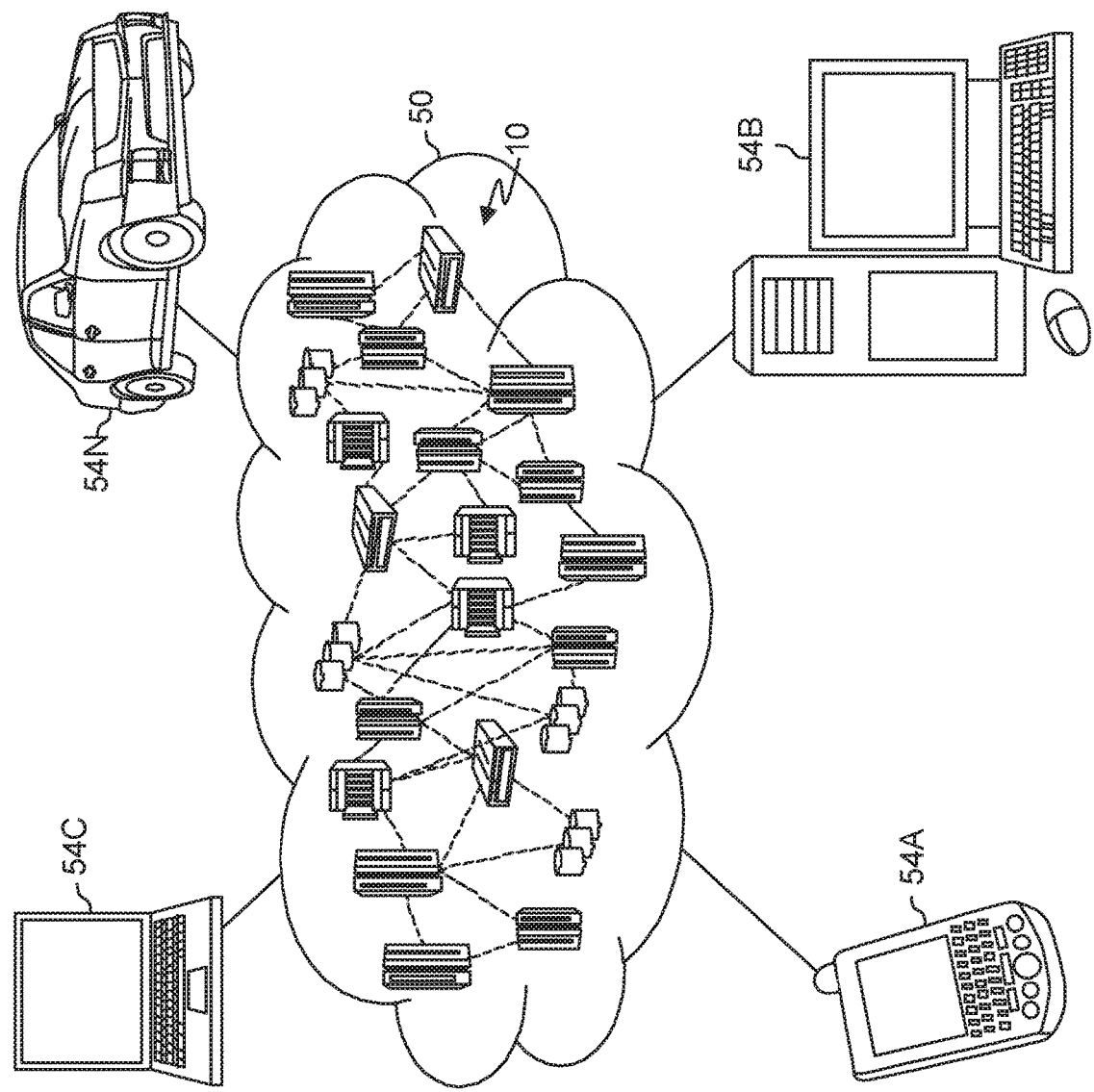
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
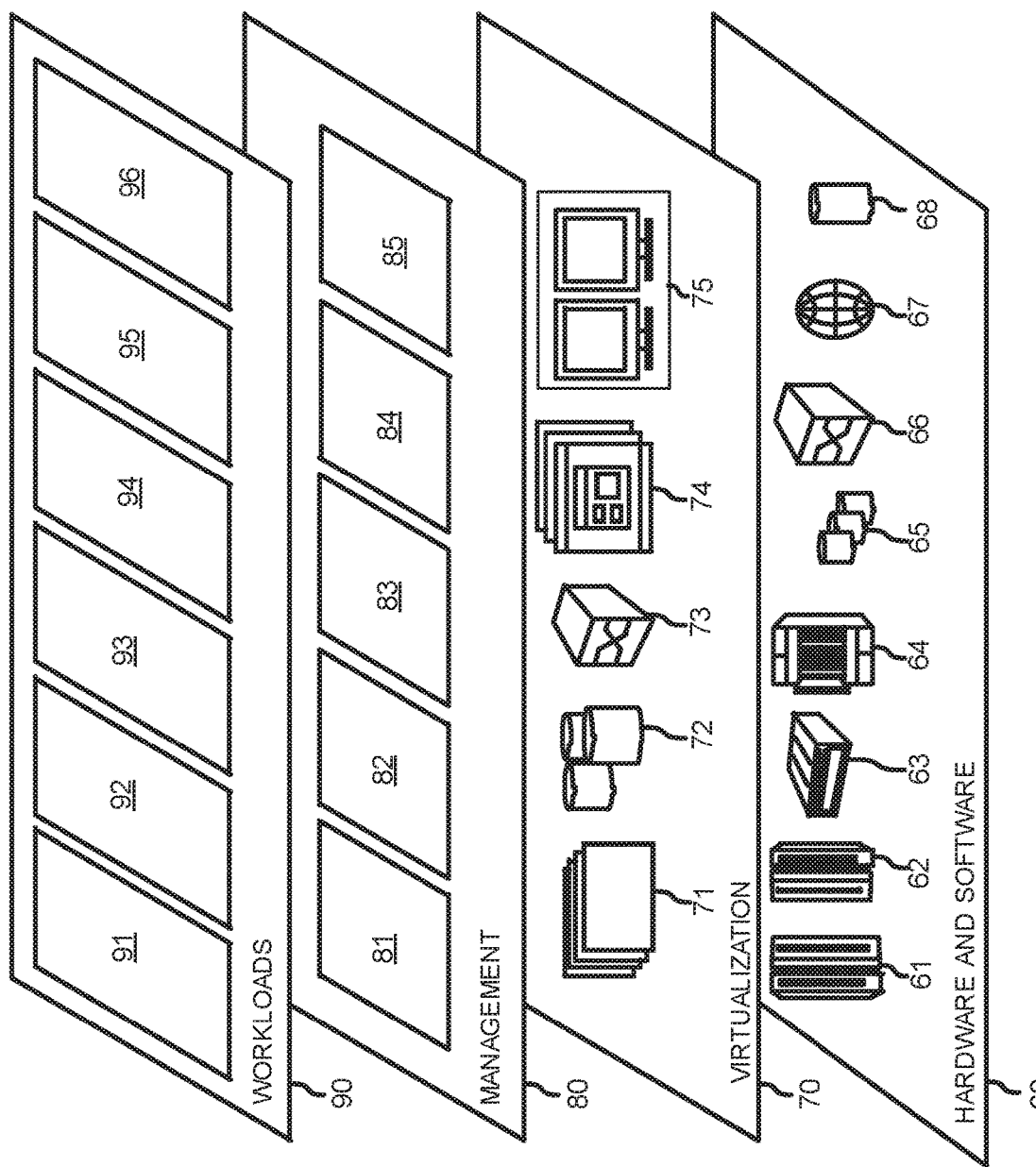
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented reality remote diagnostic processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving vehicle metadata describing a vehicle from a mobile computing device, the vehicle metadata including a problem context;
   based on the vehicle metadata, retrieving vehicle reference data;
   based on the vehicle metadata and the vehicle reference data, generating a candidate problem for the problem context;
   generating a set of candidate solutions for the candidate problem, the set of candidate solutions configured to address the problem context;
   based on the vehicle metadata and the candidate problem, generating a set of visualizations for the set of candidate solutions, each visualization generated for a specified solution based on the vehicle reference data; and
   presenting, on a display device of the mobile computing device, a visualization of the set of visualizations as an augmented reality user interface.

2. The computer-implemented method of claim 1, further comprising:
   retrieving functionality data describing a functional state of the vehicle;
   based on the functionality data, retrieving experiential data describing user experiences with one or more similar vehicles, the one or more similar vehicles sharing one or more vehicle characteristic with the vehicle; and
   based on the functionality data and the experiential data, generating a set of vehicle reference data for the vehicle.

3. The computer-implemented method of claim 2, wherein the functionality data and the experiential data are non-structured data, and generating the set of vehicle reference data for the vehicle further comprises:
   normalizing the functionality data and the experiential data, based on a data structure for the vehicle reference data, to generate normalized vehicle data; and
   generating the set of vehicle reference data from the normalized vehicle data.

4. The computer-implemented method of claim 1, wherein the candidate problem is a set of candidate problems and the set of candidate solutions is a plurality of sets of candidate solutions, each set of candidate solutions being generated for a specified candidate problem of the set of candidate problems.

5. The computer-implemented method of claim 1, wherein generating the set of candidate solutions further comprises:
   based on the vehicle metadata and the vehicle reference data, generating an augmented instruction set for a candidate solution of the set of candidate solutions;
   receiving one or more images responsive to the augmented instruction set, the one or more images depicting a portion of the vehicle associated with the candidate problem; and selecting a candidate solution, from the set of candidate solutions, based on the one or more images.

6. The computer-implemented method of claim 1, wherein generating the set of visualizations further comprises:

for each visualization, identifying one or more reference images for a candidate solution associated with the visualization, the one or more reference images selected from the vehicle reference data; and modifying the one or more reference images for presentation within the augmented reality user interface.

7. The computer-implemented method of claim 1, wherein presenting the visualization as an augmented reality user interface further comprises:

initializing an image capture device of the mobile computing device, the image capture device depicting a field of view on the display device;

detecting a vehicle component within the field of view of the image capture device; and generating one or more overlay elements on the display device, the one or more overlay elements providing solution information for a candidate solution associated with the visualization.

8. A system, comprising:

one or more processors; and a computer-readable storage medium, coupled to the one or more processors, storing program instructions that, when executed by the one or more processors, cause the one or more processors to perform operations comprising:

receiving vehicle metadata describing a vehicle from a mobile computing device, the vehicle metadata including a problem context;

based on the vehicle metadata, retrieving vehicle reference data;

based on the vehicle metadata and the vehicle reference data, generating a candidate problem for the problem context;

generating a set of candidate solutions for the candidate problem, the set of candidate solutions configured to address the problem context;

based on the vehicle metadata and the candidate problem, generating a set of visualizations for the set of candidate solutions, each visualization generated for a specified solution based on the vehicle reference data; and presenting, on a display device of the mobile computing device, a visualization of the set of visualizations as an augmented reality user interface.

9. The system of claim 8, wherein the operations further comprise:

retrieving functionality data describing a functional state of the vehicle;

based on the functionality data, retrieving experiential data describing user experiences with one or more similar vehicles, the one or more similar vehicles sharing one or more vehicle characteristics with the vehicle; and based on the functionality data and the experiential data, generating a set of vehicle reference data for the vehicle.

10. The system of claim 9, wherein the functionality data and the experiential data are non-structured data, and generating the set of vehicle reference data for the vehicle further comprises:

normalizing the functionality data and the experiential data, based on a data structure for the vehicle reference data, to generate normalized vehicle data; and generating the set of vehicle reference data from the normalized vehicle data.

11. The system of claim 8, wherein the candidate problem is a set of candidate problems and the set of candidate solutions is a plurality of sets of candidate solutions, each set of candidate solutions being generated for a specified candidate problem of the set of candidate problems.

12. The system of claim 8, wherein generating the set of candidate solutions further comprises:

based on the vehicle metadata and the vehicle reference data, generating an augmented instruction set for a candidate solution of the set of candidate solutions;

receiving one or more images responsive to the augmented instruction set, the one or more images depicting a portion of the vehicle associated with the candidate problem; and selecting a candidate solution, from the set of candidate solutions, based on the one or more images.

13. The system of claim 8, wherein generating the set of visualizations further comprises:

for each visualization, identifying one or more reference images for a candidate solution associated with the visualization, the one or more reference images selected from the vehicle reference data; and modifying the one or more reference images for presentation within the augmented reality user interface.

14. The system of claim 8, wherein presenting the visualization as an augmented reality user interface further comprises:

initializing an image capture device of the mobile computing device, the image capture device depicting a field of view on the display device;

detecting a vehicle component within the field of view of the image capture device; and generating one or more overlay elements on the display device, the one or more overlay elements providing solution information for a candidate solution associated with the visualization.

15. A computer program product comprising a computer readable storage medium having program instructions embodied therewith, the program instructions being executable by one or more processors to cause the one or more processors to perform operations comprising:

receiving vehicle metadata describing a vehicle from a mobile computing device, the vehicle metadata including a problem context;

based on the vehicle metadata, retrieving vehicle reference data;

based on the vehicle metadata and the vehicle reference data, generating a candidate problem for the problem context;

generating a set of candidate solutions for the candidate problem, the set of candidate solutions configured to address the problem context;

based on the vehicle metadata and the candidate problem, generating a set of visualizations for the set of candidate solutions, each visualization generated for a specified solution based on the vehicle reference data; and presenting, on a display device of the mobile computing device, a visualization of the set of visualizations as an augmented reality user interface.

16. The computer program product of claim 15, wherein the operations further comprise:

retrieving functionality data describing a functional state of the vehicle;

based on the functionality data, retrieving experiential data describing user experiences with one or more similar vehicles, the one or more similar vehicles sharing one or more vehicle characteristics with the vehicle; and based on the functionality data and the experiential data, generating a set of vehicle reference data for the vehicle.

17. The computer program product of claim 16, wherein the functionality data and the experiential data are non-structured data, and generating the set of vehicle reference data for the vehicle further comprises:

normalizing the functionality data and the experiential data, based on a data structure for the vehicle reference data, to generate normalized vehicle data; and generating the set of vehicle reference data from the normalized vehicle data.

18. The computer program product of claim 15, wherein generating the set of candidate solutions further comprises:

based on the vehicle metadata and the vehicle reference data, generating an augmented instruction set for a candidate solution of the set of candidate solutions;

receiving one or more images responsive to the augmented instruction set, the one or more images depicting a portion of the vehicle associated with the candidate problem; and selecting a candidate solution, from the set of candidate solutions, based on the one or more images.

19. The computer program product of claim 15, wherein generating the set of visualizations further comprises:

for each visualization, identifying one or more reference images for a candidate solution associated with the visualization, the one or more reference images selected from the vehicle reference data; and modifying the one or more reference images for presentation within the augmented reality user interface.

20. The computer program product of claim 15, wherein presenting the visualization as an augmented reality user interface further comprises:

initializing an image capture device of the mobile computing device, the image capture device depicting a field of view on the display device;

detecting a vehicle component within the field of view of the image capture device; and generating one or more overlay elements on the display device, the one or more overlay elements providing solution information for a candidate solution associated with the visualization.

\* \* \* \* \*